United States Patent [19]

Barnette et al.

[11] Patent Number: 4,525,440

[45] Date of Patent: Jun. 25, 1985

[54] SOLID STATE CELL WITH ANOLYTE

[75] Inventors: Luverne H. Barnette, Derry, N.H.; Charles C. Liang, Clarence, N.Y.

[73] Assignee: Duracell Inc., Bethel, Conn.

[21] Appl. No.: 431,881

[22] Filed: Sep. 30, 1982

Related U.S. Application Data

[62] Division of Ser. No. 262,890, May 13, 1981, Pat. No. 4,390,446.

[51] Int. Cl.$^3$ ............................................. H01M 6/18
[52] U.S. Cl. .................................................. 429/191
[58] Field of Search ................ 429/191, 193, 229, 192

[56] References Cited

U.S. PATENT DOCUMENTS 3,988,164 10/1976 Liang et al. ...................... 429/191
4,263,377 4/1981 Joshi et al. ........................ 429/50

*Primary Examiner*—Donald L. Walton
*Attorney, Agent, or Firm*—Ronald S. Cornell; Israel Nissenbaum

[57] ABSTRACT

A solid state cell having a solid cathode, a solid electrolyte, and a solid anolyte comprised of at least 50% by volume of ionically conductive materials such as the electrolyte and 50% or less by volume of an active metal. The anolyte is either the cell anode or alternatively the anolyte is an additional structural member within said cell positioned between an anode, comprised of the same active metal, and the solid electrolyte.

11 Claims, 4 Drawing Figures

SOLID STATE CELL WITH ANOLYTE

This is a division of application Ser. No. 262890, filed 5-13-81 now U.S. Pat. No. 4,390,446.

This invention relates to solid state cells having active metal anodes such as lithium and particularly those cells having anodes with included electrolyte.

Solid state cells in which all of the components including the electrolyte are solid during cell operation have certain advantages and disadvantages. The solid state cells are immune to detrimental electrolyte leakage which tends to plague fluid electrolyte cells. Additionally the solid state cells have extremely long shelf lives generally in excess of ten years. Furthermore, the solid state cells, even with active metal anodes, are extremely stable even under abusive conditions when compared to their fluid electrolyte cell counterparts. As a result, solid state cells are ideal for use with for example delicate electronic componentry and human implanted heart pacemakers. However, the very nature of the solid electrolyte which provides the advantageous stability constrains such cells to relatively low discharge capabilities when compared to fluid electrolyte cells. Solid ionic conduction is very slow when compared to ionic conduction in fluids with the practical cell discharge rate being determined by the ionic conductivity of the electrolyte. The electrolytes used in high capacity and high voltage active metal anode solid state cells (because of chemical compatibility with the anode) have particularly low ionic conductivities and practical discharge capabilities (in the low microampere or microwatt region).

The construction of a solid state cell generally requires high compacting pressure of components or other similar means to provide intimate electrode-electrolyte interfaces whereby the solid ion conduction is possible. At relatively high drain rates solid state cell life is drastically shortened as a result of disruption of the interface, with mechanical and electrical disconnection between the electrolyte and the electrodes, particularly the anode. During discharge of a solid state cell having, for example, a lithium anode, lithium cations at the anode-electrolyte interface leave the interface, travel through the solid electrolyte to the cathode at which site the cell reaction takes place. The departing lithium cations leave vacancies behind which are continuously filled by additional diffusing lithium from the bulk of the anode. At higher drain rates, however, the departure of the lithium cations causes the vacancies to be formed faster than they can be filled with resultant coalescing of the vacancies to form irreparable, unbridgeable gaps at the anode-electrolyte interface. These gaps further increase localized interfacial vacancies by shunting cation flow through the remaining reduced interfacial contact area. As a result, gap formation rapidly increases with a mechanical and electrical disconnection or delamination between anode and electrolyte occurring which severely curtails cell capacity. Active anode metals such as lithium which have relatively poor self diffusion rates are particularly constrained to low discharge rates up to the limiting discharge rate at which vacancy formation (with coalescing into detrimental gaps) occurs at a rate faster than additional cation filling of the vacancies.

It is an object of the present invention to increase solid state cell capacity at relatively high discharge rates. This and other objects, features and advantages of the present invention will become more evident from the following discussion as well as the drawings in which.

Figure 1:
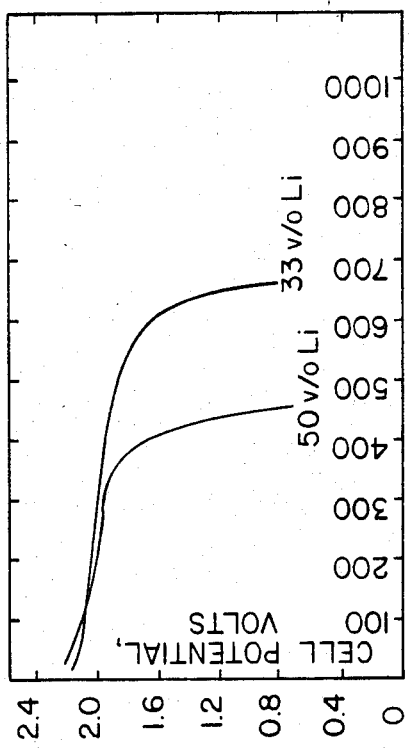
FIG. 1 is a graphic representation of discharge curves of cells embodying the present invention.

Generally the present invention comprises a solid state cell having a solid cathode, a solid electrolyte and an active metal solid anolyte. The solid anolyte is comprised of at least 50% by volume of an ionic conductor such as the electrolyte and 50% or less by volume of the active metal. The anolyte either constitutes the entire active anode for the cell or is present as an additional structural member interposed between the active metal anode and the solid electrolyte. It has been discovered that the massive inclusions of electrolyte (50% or more by volume) with the solid anolyte, particularly when the anolyte constitutes the entire anode, dramatically increases dischargeable cell capacity at relatively high discharge rates (e.g. above about 0.25 mW) despite the severe reduction of active metal content within the anolyte (an anolyte comprised of 50% by volume lithium metal and 50% by volume of a LiI, LiOH, $Al_2O_3$ (LLA) electrolyte is only about 13% by weight lithium) as compared to prior art cells having pure active metal anodes. It has in fact been further discovered that additional increases in electrolyte content with concomitant reduction in active metal content still further increases the high rate capacity. Thus a cell having 33% by volume lithium anolyte (about 7% by weight) with LLA electrolyte provides more than double the capacity of cells having pure lithium anodes at the higher drain rates.

Though not as effective at high drain rates as the anolyte which constitutes the entire anode, a thin layer solid anolyte positioned between the active metal anode and the solid electrolyte has the advantage of retaining substantially all of the low drain rate capacity if the layer is very thin while enhancing high rate drain capacity. Because of its smaller dimensions it is preferred that the electrolyte content in the interposed thin anolyte layer be greater than the amount utilized in the anolyte which constitutes the entire active anode. The percentage of the electrolyte to be used in the anolyte layer is generally determined by the thickness of the layer and ranges from about 95% by volume for very thin layers (1 mil) to the 50% such as when the anolyte layer comprises the entire anode.

It is postulated that the solid anolyte increases interfacial contact between the active anode metal (whether within the anolyte or adjacent thereto) and the electrolyte thereby reducing the likelihood of coalescing of vacancies into the detrimental and irreparable gaps. The anolyte which also comprises the anode further enhances cation travel rates of the anode metal since the ionic conductivity of the electrolyte is greater than the self diffusion rate in active metals such as lithium. Because of greater surface area contact the anolyte further provides shorter diffusion paths, and as a result the vacancies are filled at a greater rate before they can form the irreparable gaps. Finally the anolyte decreases the sharp interface between anode and electrolyte present in prior art cells whereby the occurrence of mechanical and electrical disconnection or delamination between anode and electrolyte is significantly reduced or delayed. In order to provide such effect it is essential that the electrolyte (or ionic conductor) content within the anolyte be massive with a 50% by volume inclusion constituting a lower limit for the electrolyte content. Thus various prior art patents such as U.S. Pat. Nos. 3,455,742; 3,730,775; and 3,824,130 which peripherically suggest the inclusion of electrolyte in the anode do not however suggest the massive inclusions of the present invention wherein the active metal of the anode actually becomes a minor part thereof and wherein unexpectedly markedly superior performance characteristics are achieved thereby. Additionally, the patents do not even hint at the utilization of an additional structural element of a thin anolyte layer as in one embodiment of the present invention.

The active metals used in the solid anolytes of the present invention as the anode active material are generally metals above hydrogen in the EMF series and more specifically alkali metals particularly lithium. The materials used as the electrolyte of the cell and as the conductive anolyte component need not be the same but both should have electrolyte conductivity characteristics; i.e., ionic conductivity greater than the equivalent self diffusion rate of the active anode metal, generally greater than $1 \times 10^{-7}$ ohm$^{-1}$cm$^{-1}$ at room temperatures, and should be chemically compatible with the anode metal. The material utilized in the anolyte may however be electronically conductive which property would render it unfit (since it would cause an internal cell short circuit) for use as the cell electrolyte itself. It is, however, preferred that the cell electrolyte itself be the material which is admixed with the active metal in the anolyte. The most preferred electrolyte material for use in active metal solid state cells (and in the anolyte and as the electrolyte of the present invention) is LiI particularly when admixed with $Al_2O_3$ and/or LiOH (LLA as described above) or with other suitable dopants which increase ionic conductivity. Other highly ionically conductive materials such as $Na_xWO_3$ ($x<1$) are utilizable as the conductive materials in the anolyte, particularly with a sodium active anode metal. However, $Na_xWO_3$ is also electronically conductive whereby its use as the electrolyte for the cell is precluded.

Solid active cathode materials utilized in the cells of the present invention generally comprise those materials commonly used in solid state cells such as metal halides; metal chalcogenides; halogens i.e. iodine; metal oxides; chalcogens i.e. sulfur, selenium and tellurium; and mixtures such as the $PbI_2/PbS$ cathode described in U.S. Pat. No. 3,959,012 and the $TiS_2/S$ cathode described in copending application Ser. No. 129,144 now U.S. Pat. No. 4,263,377. Because of their particularly high energy densities, cathodes as described in the aforementioned patent and application are preferred as cathodes for cells having the anolytes of the present invention.

In order to more clearly illustrate the efficacy of the present invention the following examples are presented. Details contained within such examples are however, not to be considered as limitations on the present invention. All of the cells in the following Examples 1-5 have cathodes which are 73.9% $TiS_2$, 21.1% S and 5% LiI by weight and are of substantially the same dimensions i.e. 1.25" (3.18 cm) diameter by 0.040" (0.10 cm) height. Because of the volumetric constraints imposed by specific cell sizes, comparisons wherever made between cells are made on a volumetric rather than a gravimetric basis. Weights of specific component materials are provided for complete illustrative purposes. Unless otherwise indicated all parts are parts by weight.

EXAMPLE 1

Three cells each comprised of a solid cathode weighing 0.650 gm with a surface area of 7.92 cm$^2$; a solid anolyte of 50% by volume lithium metal and 50% by volume LLA weighing 0.650 gm (13.2% Li and 86.8% LLA) with a surface area of 7.42 cm$^2$; and a solid LLA electrolyte therebetween are discharged at room temperature. The cells are discharged at the different rates of 300, 250 and 200 µwatts as indicated in FIG. 1 and provide discharge times of about 400, 800 and 1100 hours respectively.

EXAMPLE 2

Figure 2:
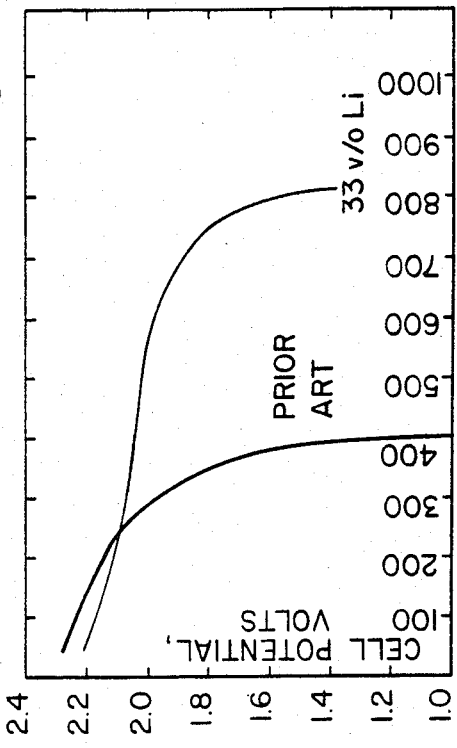
FIG. 2 is a graphic representation of discharge curves of cells of a second embodiment of the present invention.

Four cells each comprised of a solid cathode weighing 0.900 gm with a surface area of 7.92 cm$^2$; a solid anolyte of 33% by volume lithium metal and 67% by volume LLA weighing 0.530 gm (7.04% Li and 92.96% LLA) with a surface area of 7.42 cm$^2$; and a solid LLA electrolyte therebetween are discharged at room temperature. The cells are discharged at the different rates of 250, 225, 200 and 175 µwatts as indicated in FIG. 2 and provide discharge times of about 800, 1175, 1400 and 1900 hours respectively.

EXAMPLE 3

Figure 3:
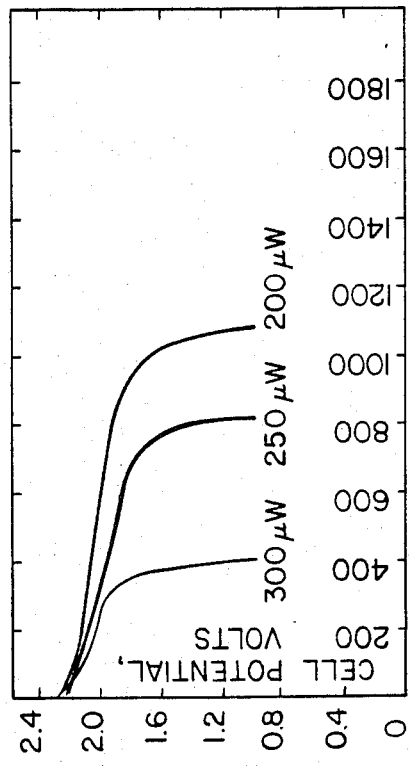
FIG. 3 is a discharge curve comparison between batteries comprised of the cells depicted in FIGS. 1 and 2.

Two batteries, with each having two cells in parallel are made. The cells of one battery are each comprised of a 700 mg cathode, a 650 mg solid anolyte of 50% by volume LLA and 50% by volume Li and a LLA electrolyte. The cells of the other battery are each comprised of a 700 mg cathode, a 800 mg anolyte of 33% by volume Li and 67% by volume LLA and a LLA electrolyte. The batteries are discharged at 600 µwatts at room temperature with the results shown in FIG. 3. The cell having the 33% by volume lithium (56.32 mg) anolyte provides a discharge time of about 675 hours and the cell having the anolyte with 50% by volume lithium (85.8 mg) providing about 465 hours of discharge time. It is accordingly evident that at the higher rates, cells having the lesser volume of lithium, with concomitant greater amounts of electrolyte inclusion, are markedly superior.

EXAMPLE 4

Figure 4:
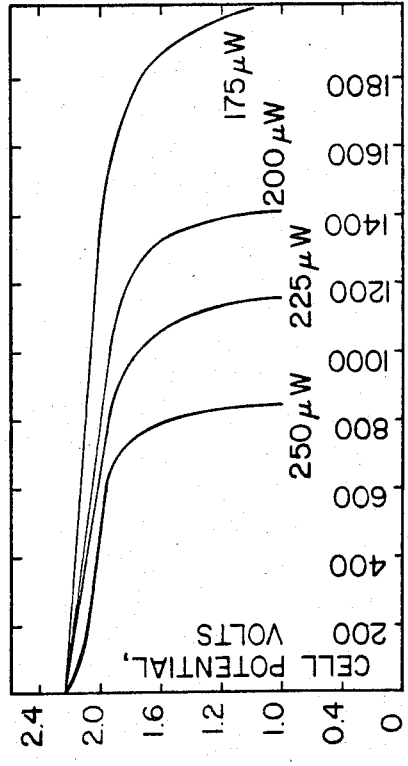
FIG. 4 is a discharge curve comparison between a cell of the prior art and a cell as depicted in FIG. 2.

Two cells with each having a cathode weighing 0.90 gm and an LLA solid electrolyte but with one cell having a lithium foil anode weighing 0.113 gm in accordance with prior art and the other having an anode weighing 0.530 gm comprised of 33% by volume lithium (0.0373 gm) and 67% by volume LLA electrolyte. The cells are discharged at room temperature at a discharge rate of 250 µwatts with the comparative discharge curve shown in FIG. 4. With about one-third the lithium by weight in the anode thereof the cell with the 33% by volume lithium anode provides more than double the discharge capacity of the prior art cell.

EXAMPLE 5

Nine batteries are made with each having the dimensions 1.3" (3.3 cm) O.D.×0.1" (0.25 cm) Ht and comprised of 2 cells in parallel. The cells are each comprised of 0.90 gm cathodes and LLA electrolyte. The cells of three of the batteries (1-3) contain 1.113 gm lithium foil anodes in accordance with the prior art. The cells of three batteries (4-6) contain 0.530 gm, 33% by volume Li and 67% by volume LLA, anodes. The cells of the last three batteries (7-9) contain 0.650, gm 50% by volume Li and 50% by volume LLA, anodes. All the batteries are discharged at varying power drains with the comparative realizable energy densities at the indicated power drains shown in the following table:

Realizable Energy Density (W.hrs/in$^3$) at Indicated Power Drain

| Batteries | Power Drain: | 0.05 mW | 0.3 mW | 0.5 mW |
|---|---|---|---|---|
| 1-3 | Prior Art | 7.5 | 0.5 | 0.1 |
| 4-6 | 33 v/o Li anode | 6.8 | 6.0 | 3.3 |
| 7-9 | 50 v/o Li anode | 9.8 | 5.7 | 2.6 |

EXAMPLE 6 (PRIOR ART)

A cell is constructed with a lithium anode (0.04 gm foil) an LLA electrolyte and a 0.100 gm cathode comprised of 80% TiS$_2$ and 20% S. The anode and cathode geometric areas are 1.48 cm$^2$ and 1.77 cm$^2$ respectively. The cell is discharged at room temperature under a constant load of 23 kohm (about 175 microwatts). The cell shows an abrupt decrease in load voltage after about 20 hours.

EXAMPLE 7

A cell is made in accordance with Example 6 but with the addition of a 50 mg layer (about 5 mils) of a mixture of LLA and 4% lithium (about 20% by volume) interposed between anode and electrolyte. The cell is discharged as in Example 6 and shows no abrupt decrease in load voltage even after 300 hours of discharge (about 25 mAh). The discharged capacity is well in excess of the additional lithium capacity in the layer added to the capacity of the prior art cell of Example 6.

It is evident from the above Examples that the cells of the present invention having solid anolytes therein are substantially better in terms of high rate performance than cells of the prior art. It is further evident that at the increasingly higher rates, cells having lesser amounts of anode metal in the anolyte are clearly superior in capacity. It is however understood that the above Examples were presented for illustrative purposes only. Accordingly, changes may be made in cell components, structure, relative proportions of materials and the like without departing from the scope of the present invention as defined in the following claims.

What is claimed is:

1. A solid state cell comprising a solid cathode, a solid electrolyte and a solid anolyte characterized in that said anolyte is comprised of a solid active metal anode material admixed with a cationic conductor and wherein said cationic conductor comprises at least 50% by volume of said anolyte.

2. The solid state cell of claim 1 wherein said solid anolyte comprises a layer interposed between and intimately contacted with said solid electrolyte and an active metal anode.

3. The solid state cell of claim 1 wherein said solid anolyte comprises the anode for said cell.

4. The solid state cell of claim 2 wherein said cationic conductor is the material which comprises said electrolyte.

5. The solid state cell of claim 3 wherein said cationic conductor is the material which comprises said electrolyte.

6. The solid state cell of claim 2 wherein said cationic conductor comprises up to 95% by volume of said anolyte.

7. The solid state cell of claim 3 wherein said cationic conductor comprises up to 67% by volume of said anolyte.

8. The solid state cell of claims 1 or 2 or 3 wherein said active metal of said anode and said anolyte is lithium.

9. A solid state cell comprising a solid cathode comprised of a member of the group consisting of metal chalcogenides, metal halides, chalcogens, halogens, metal oxides and mixtures thereof; a solid electrolyte comprised of LiI; and a solid anolyte comprised of lithium and said solid electrolyte wherein said anolyte comprises the anode for said cell and wherein said solid electrolyte in said anolyte is at least 50% by volume thereof.

10. The solid state cell of claim 9 wherein said solid electrolyte in said anolyte comprises 67% by volume thereof.

11. The solid state cell of claim 9 or 10 wherein said cathode is comprised of an admixture of TiS$_2$ and S.

* * * * *